United States Patent Office 3,528,071

Patented Sept. 8, 1970

3,528,071

RADAR SENDING INSTALLATION

Mattheus Gerardus Disselen, Rijswijk, South Holland, Netherlands, assignor to Nederlandse Organisatie voor Toegepast - Natuurweten - Schappelijk Onderzoek ten behoeve van de Rijksverdediging, The Hague, Netherlands, a corporation of Netherlands Continuation-in-part of application Ser. No. 189,657, Apr. 9, 1962. This application June 15, 1965, Ser. No. 464,243

Claims priority, application Netherlands, Apr. 26, 1961, 264,088

Int. Cl. G01s 7/28

U.S. Cl. 343—17.1 9 Claims

ABSTRACT OF THE DISCLOSURE

A frequency agile radar system comprising a random pulse frequency transmitter, a voltage tuned local oscillator, varying voltage tuning mechanism adapted to stop change of voltage at a predetermined point, and reset, and a means to change the transmitter pulse frequency during the interpulse interval.

This application is a continuation-in-part of my copending U.S. patent application Ser. No. 189,657, filed Apr. 9, 1962, and now abandoned.

The present invention relates to a radar sender in which the carrier frequency can jump arbitrarily within a relative broad range of frequencies between one pulse and the next.

These frequency jumps prevent jamming by an enemy in a high degree and enable the operator of the receiver belonging to the sender to recognize with a very high degree of certainty the echo pulses due to the pulses of the sender.

According to the invention the speed with which the frequency of the local oscillator is changed is so high that the whole of the range, wherein the frequency of the pulse can be chosen is covered within the duration of a pulse.

If at the beginning of an impulse the frequency of the local oscillator is lower than the lower limit of the range for the pulse frequency by an amount slightly higher than the chosen intermediate frequency and the local oscillator is swept over a range somewhat greater than the range allotted to the carrier frequency of the pulse, it is certain that the difference between the pulse frequency and the local oscillator at some time during the pulse will be equal to the intermediate frequency, provided the frequency sweep is carried out during the pulse. To achieve this result a voltage tuned local oscillator is used and the voltage controlling the frequency of the local oscillator is excited anew at the beginning of each pulse and is changed so rapidly that within the duration of a pulse it can bring about a frequency sweep of the local oscillator that is at least equal to the frequency range allotted to the pulse frequency; this change is terminated as soon as an I.F.-signal appears in the output of the I.F. amplifier and immediately before the next pulse the search-voltage is set to a predetermined value.

According to the invention the search-voltage can be obtained by charging a condenser connected to a charging circuit that is disconnected when the I.F. signal appears; this condenser is discharged immediately before the next pulse begins and the charging circuit is again switched on. According to a special embodiment of the invention the discharging of the condenser and the switching on of the charging circuit can be carried out by means of an auxiliary pulse derived from the leading edge of the sender pulse. An embodiment of the invention is illustrated in the drawing by way of example.

Figure 1:
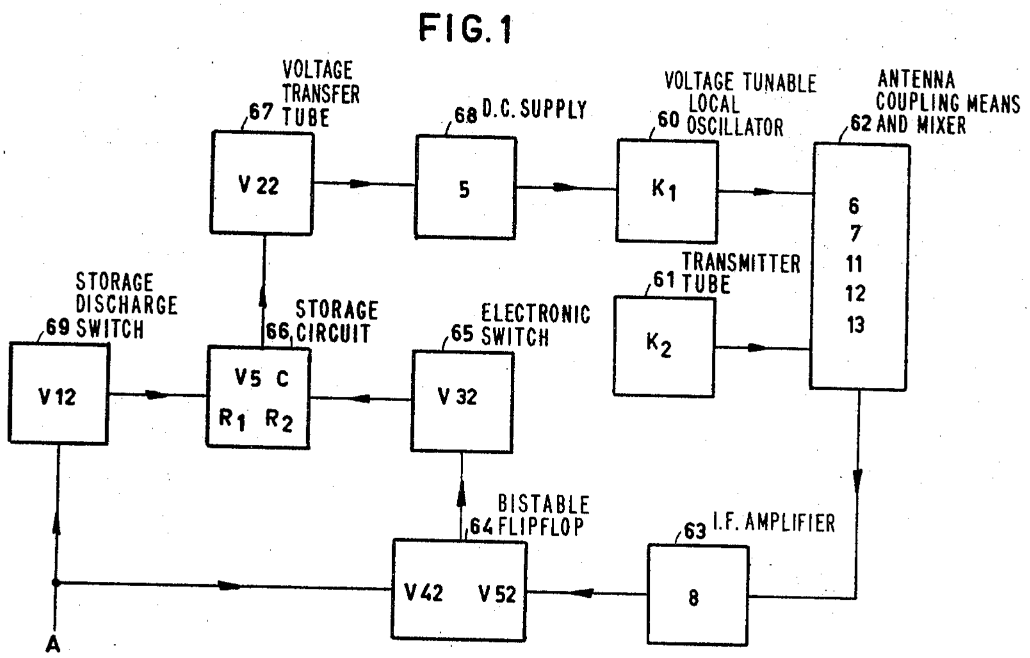
FIG. 1 is a block diagram illustrating the general arrangement of an embodiment of the invention.
Figure 2:
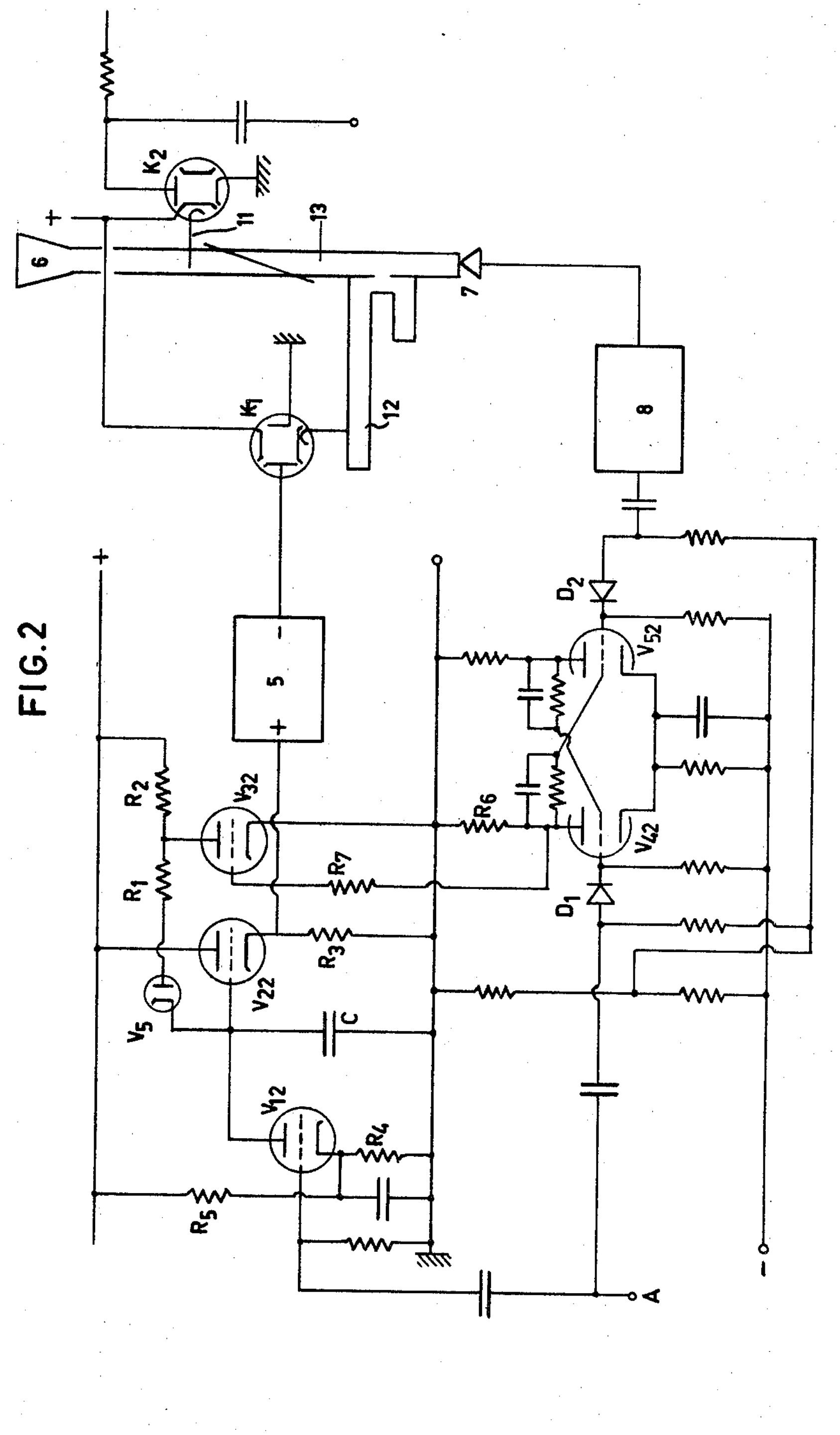
FIG. 2 shows the details of the essential parts of the circuit for this embodiment.

In the blocks shown in FIG. 1 the reference numbers relating to the essential details of the circuit shown in FIG. 2 have been inserted.

Block 60 of FIG. 1 comprises the local oscillator $K_1$ of FIG. 2 and 61 the sender tube $K_2$. Block 62 comprises the antenna 6. This antenna is coupled with the tube $K_2$ by the coupling 11; this block further comprises a wave guide 13 and a coupling 12, which in a known manner is designed so that it can feed energy from the local oscillator $K_1$ to a mixing crystal 7, but that $K_1$ receives no energy from the antenna 6 through the wave guide 13.

Block 63 comprises an I.F. amplifier 8. This amplifier has its output connected to a bistable flip-flop in block 64. This flip-flop comprises two tubes, $V_{42}$ and $V_{45}$. The I.F. amplifier feeds energy from the mixer 7 to the flip-flop.

The flip-flop serves as an electronic switch that in one state cuts off tube $V_{32}$ in block 65 and in the other renders this tube conductive. Block 66 comprises the condenser C and a charging circuit, consisting of the resistances $R_1$, $R_2$ and the diode $V_5$. Dependent on the state of the flip-flop, the charging circuit of the condenser C is switched on or off. Block 67 comprises a tube $V_{22}$ that transfers the voltage of the condenser to the D.C.-source 5 in block 68. This source produces the tuning voltage for tube $K_1$.

Block 69 comprises a tube $V_{12}$ that can be rendered conductive by means of a pulse applied at A, thereby enabling condenser C to discharge.

FIG. 2 shows a somewhat more detailed diagram of the circuitry.

Antenna 6 is the sending antenna. It receives energy from the sender tube $K_2$ (a magnetron for example) through the coupling means 11.

The local oscillator $K_1$ is coupled with the wave guide 12, which in a generally known manner is coupled in such a manner to the wave guide that is connected to the antenna, that it transfers energy to the wave guide 13 but receives no energy from the antenna.

The wave guide 13 carries energy from the sender tube and from the local oscillator to the mixing crystal 7. The output of 7 is connected with the input of the I.F. amplifier 8.

The frequency of the local oscillator $K_1$ depends on the voltage applied to the reflector electrode of $K_1$, which in the present embodiment is a klystron.

The voltage applied to the reflector electrode of $K_1$ consists of two parts, to wit, the constant voltage of the source 5 itself and the added voltage of the condenser C. One electrode of C is connected to the grid of tube $V_{22}$, the other to the terminal of the resistance $R_3$ that is not connected to the cathode of $V_{22}$.

The charging circuit of C comprises the resistances $R_1$, $R_2$ and the diode $V_5$. The cathode of this diode is connected with the electrode of the condenser C that is connected to the grid of $V_{22}$.

The connecting point of the resistances $R_1$, $R_2$ is connected to the anode of tube $V_{32}$ and the cathode of diode $V_5$ is connected with the condenser and with the anode of tube $V_{12}$. When $V_{12}$ and $V_{32}$ are cut off, the condenser C is charged. The limit of the voltage of C depends on the potential of the supply source (not shown in the figure) of the tubes $V_{22}$, $V_{12}$, $V_{32}$.

The grid of $V_{12}$ is kept at a negative potential with respect the cathode by the resistances $R_4$ and $R_5$. The potential across $R_4$ is high enough to cut off tube $V_{12}$.

Tube $V_{32}$ is cut off as long as the resistance $R_6$ carries a current, that is as long as tube $V_{42}$ is conductive.

As soon as $V_{42}$ is cut off, resistance $R_6$ carries no current, so that the anode voltage of $V_{32}$ decreases. It will be seen that tube $V_{32}$ acts as a voltage controlled resistance.

If the value of $R_2$ is suitably chosen the condenser will then pick up no further charge. The voltage of the condenser will remain practically constant in the interval between two consecutive pulses and as the repetition period of the pulses is short, for instance at most a few miliseconds, the frequency of the local oscillator will remain practically constant.

The switching off of the charging circuit of condenser C is due to the output signal of the I.F. amplifier that occurs when the difference of the local oscillator and that of the pilse equals the resonant frequency of the I.F. amplifier.

The signal from the I.F. amplifier is fed to diode $D_2$. Thereby the voltage of the grid of tube $V_{52}$ is driven high and the effect thereof is that tube $V_{42}$ is cut off and $V_{52}$ becomes conductive. Thereby the charging of the condenser is stopped as $R_6$ then carries no current.

Just before the next pulse, an impulse introduced at point A drives the potential of the grid of tube $V_{12}$ high. The anode of $V_{12}$ then becomes low, so that the condenser discharges.

The pulse applied at A drives the grid of tube $V_{42}$ also high, so that tube $V_{42}$ becomes conductive and $V_{52}$ is cut off.

As now $R_6$ again carries a current, $V_{32}$ will be cut off and the condenser will be charged again, so that a new cycle begins.

The pulse at A can be formed in various ways. A suitable method is for example to feed the leading edge of the modulator impulse that initiates the sender pulse to a differentiating circuit consisting of a condenser in series with a resistance. A very short impulse will then occur in the resistance that drives the grid of $V_{12}$ high so that $V_{12}$ is rendered conductive during a very short time.

The trailing edge of the modulator impulse will cause an impulse of inversed polarity that has no effect because at the moment this pulse arrives the tube $V_{12}$ is cut off.

I claim:

1. A frequency agile radar system comprising a transmitter producing a random pulse frequency, a voltage tuned local oscillator, means to change the voltage applied to said voltage tuned local oscillator at the beginning of said transmitter pulse, means to stop said change of voltage when a predetermined difference between said transmitter pulse frequency and the frequency of the local oscillator is obtained, means to reset the voltage applied to said local oscillator to a predetermined value at the end of the interpulse interval and means to change the transmitter pulse frequency during the interpulse interval.

2. A frequency agile radar installation comprising a transmitter producing a random pulse carrier frequency, a local oscillator comprising a voltage tuned tube, a voltage charging circuit, said voltage charging circuit comprising a condenser, means to adjust the difference between said pulse carrier frequency and the frequency of said voltage tuned local oscillator equal to a suitably chosen intermediate frequency by producing a search voltage in said voltage charging circuit for changing the frequency of said local oscillator by charging said condenser during the transmitter pulse interval, means to apply the potential between the electrodes of said condenser to an electrode of said voltage tuned tube of said local oscillator, a rectifier, a voltage supply source, a resistance, means to charge said condenser by means of said resistance connected to said voltage supply source in series with said rectifier, the cathode of said rectifier being connected to one electrode of said condenser, the other electrode of the rectifier being connected to a fixed potential, an I.F. amplifier, means to stop the charging of said voltage charging circuit by the output signal of said I.F. amplifier, which signal is produced when the difference between said pulse carrier frequency and the frequency of said local oscillator equals the resonant frequency of said I.F. amplifier, means to discharge said charging circuit at the end of the interpulse interval between two consecutive pulses.

3. The radar installation of claim 2 wherein said means to stop the charging of said voltage charging circuit by the output signal of said I.F. amplifier comprises a voltage controlled resistance connected between an intermediate point of said resistance in said condenser charging means and a fixed potential and means to change the voltage of said voltage controlled resistance.

4. The radar installation of claim 3 wherein said means to change the voltage of said voltage controlled resistance comprises a flip-flop having the input of one-half connected to the output of said I.F. amplifier and means to derive said controlling voltage for said voltage controlled resistance from the second half of said flip-flop.

5. The radar installation of claim 2 wherein said means to discharge said charging circuit at the end of the interpulse interval between two consecutive pulses is derived from an auxiliary pulse which in turn is derived from the forward edge of the next consecutive transmitter pulse.

6. Radar transmitter and receiver installation comprising a transmitter adapted to transmit pulses having a frequency which can have any value in a wide range, and a voltage tuned local oscillator, a mixer to mix the received oscillation with those of the local oscillator, an intermediate frequency amplifier for receiving the output of the mixer, means to vary the frequency of the local oscillator in an interval of time equal to the duration of a transmitter pulse over a large range of frequencies, said means consisting of a relaxation generator comprising a charging circuit and a condenser, the voltage being built up in said condenser being fed to said voltage tuned local oscillator, said charging circuit comprising a rectifier, a voltage supply source, a resistance, means to charge said condenser by means of said resistance connected to said voltage supply source in series with said rectifier, the cathode of said rectifier being connected to one electrode of said condenser, the other electrode of said rectifier being connected to a fixed potential, means to disconnect said condenser from said charging circuit by the output signal of said intermediate frequency amplifier which occurs when the difference between the frequency of said transmitter pulse and that of said oscillator equals the resonant frequency of said intermediate frequency amplifier, and means to discharge said condenser at the end of the interpulse interval between two consecutive pulses.

7. The radar transmitter and receiver installation of claim 6 wherein said means to disconnect said condenser from said charging circuit by the output signal of said intermediate frequency amplifier comprises a voltage controlled resistance connected between an intermediate point of said resistance in said charging circuit and a fixed potential and means to change the voltage of said voltage controlled resistance.

8. The radar transmitter and receiver installation of claim 7 wherein said means to change the voltage of said voltage controlled resistance comprises a flip-flop having the input of one-half connected to the output of said intermediate frequency amplifier and means to derive said controlling voltage for said voltage controlled resistance from the second half of said flip-flop.

9. The radar transmitter and receiver installation of claim 6 wherein said means to discharge said charging circuit at the end of the interpulse interval between two consecutive pulses is derived from an auxiliary pulse which in turn is derived from the forward edge of the next consecutive transmitter pulse.

References Cited

UNITED STATES PATENTS 3,163,862 12/1964 Jenny ------------- 343—17.1

RODNEY D. BENNETT, Primary Examiner

M. F. HUBLER, Assistant Examiner

U.S. Cl. X.R.

343—14, 17.2